United States Patent [19]

Tomsyck et al.

[11] Patent Number: 4,501,396
[45] Date of Patent: Feb. 26, 1985

[54] VIDEO CASSETTE TIME LEFT GAUGE

[75] Inventors: John P. Tomsyck, St. Paul; Thomas J. Zohn, Woodbury, both of Minn.

[73] Assignee: Minnesota Mining and Manufacturing Company, St. Paul, Minn.

[21] Appl. No.: 500,544

[22] Filed: Jun. 2, 1983

[51] Int. Cl.³ .................... G03B 1/04; G11B 15/32
[52] U.S. Cl. ........................... 242/199; 206/459; 283/48 R; 283/81; 40/360; 40/611
[58] Field of Search .................. 242/197–200, 242/55.19 A; 206/459; 116/295, 302, 308, 334, DIG. 37; 360/93, 132, 137; 40/360, 611; 352/72–78; 283/21, 48 R, 48 A

[56] References Cited

U.S. PATENT DOCUMENTS

| 1,092,184 | 4/1914 | Stevens | 283/48 R |
| 2,832,138 | 4/1958 | Sullenberger | 33/1 |
| 2,937,818 | 5/1960 | Zorn | 242/55.13 |
| 3,414,269 | 12/1968 | Appel | 242/199 X |
| 3,565,367 | 2/1971 | Yamamoto | 242/199 |
| 3,630,170 | 12/1971 | Christo | 360/132 X |
| 3,718,290 | 2/1973 | Wright | 242/199 |
| 3,810,246 | 5/1974 | Stone, Jr. et al. | 242/199 |
| 3,912,194 | 10/1975 | Chan | 242/199 |
| 3,913,200 | 10/1975 | Kossor | 360/137 X |
| 4,059,912 | 11/1977 | Noah | 40/2 R |
| 4,135,316 | 1/1979 | Saito | 242/199 X |
| 4,204,706 | 5/1980 | Blum et al. | 283/21 |
| 4,217,614 | 8/1980 | Balson | 360/132 |

FOREIGN PATENT DOCUMENTS

| 2709142 | 9/1978 | Fed. Rep. of Germany | 242/199 |
| 2709987 | 9/1978 | Fed. Rep. of Germany | 242/199 |
| 3140137 | 5/1983 | Fed. Rep. of Germany | 283/48 A |
| 1046547 | 12/1953 | France | 242/199 |

Primary Examiner—Leonard D. Christian
Attorney, Agent, or Firm—Donald M. Sell; James A. Smith; William B. Barte

[57] ABSTRACT

A time-remaining gauge for use with video cassettes is provided, wherein the gauge includes a substrate having a pressure sensitive adhesive on one side and various indicia on the other side which may be aligned with the radius of tape on a supply or take-up spool on the cassette and viewed through a window in the cassette on which the gauge is affixed.

3 Claims, 8 Drawing Figures

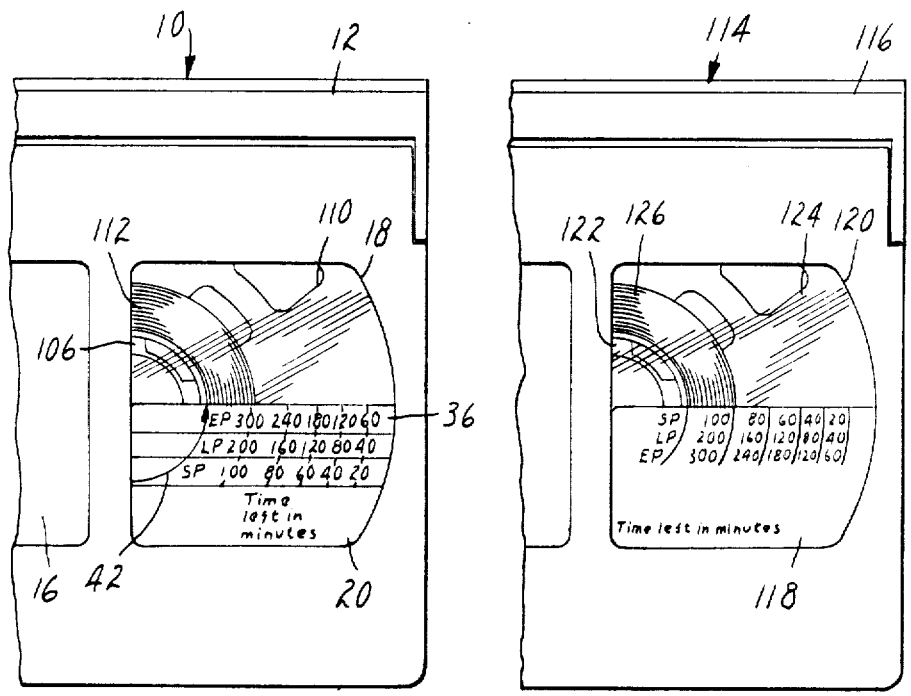
FIG. 6
FIG. 7
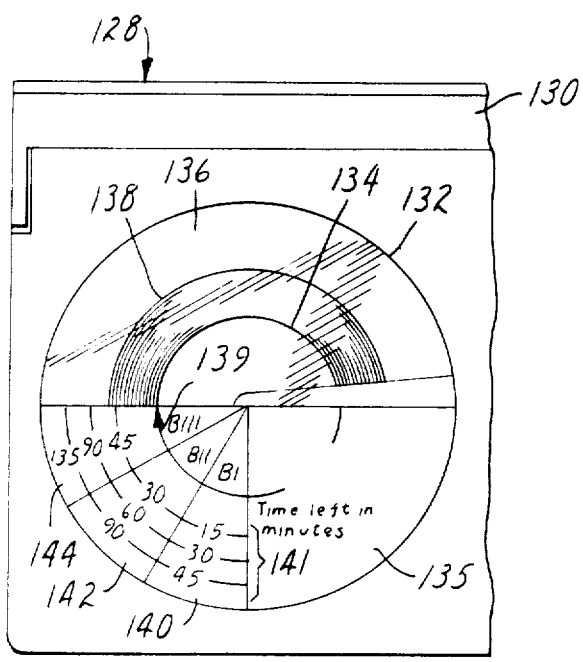
FIG. 8

VIDEO CASSETTE TIME LEFT GAUGE

FIELD OF THE INVENTION

This invention relates to video cassettes, and in particular to devices and apparatus enabling accurate determination of the amount of tape on a supply or take-up spool, and hence of the time remaining at a given tape speed until the end of the tape is reached.

BACKGROUND OF THE INVENTION

The use of indicia of various kinds to generally indicate the amount of tape or film on a spool is readily recognized. Philips-type audio cassettes as well as VHS and Beta type video cassettes have for years been supplied with ribs molded into the cassette enclosures which are intended to allow the user to estimate the relative amount of tape on each spool, and from that, assuming the user to be aware of the tape speed, to calculate the available running time. Such indicators are notorious for the confusion resulting when one attempts to use them, with the result that they are virtually totally disregarded. One attempt to improve the accuracy of such indicators is presented in U.S. Pat. No. 2,937,818 (Zorn), wherein matching bars are molded on both the take-up spool and on the window of the tape container, thus allowing the user to align the matching bars to avoid parallax errors. That patent suggests providing two measured divisions, one being graduated in units of length and the other in time. U.S. Pat. No. 3,718,290 (Wright) is exemplary of prior suggestions for providing accurate indications of prerecorded selections on a prerecorded tape, and depicts a transparent window adapted to be inserted in a tape container and having a series of opaque dots corresponding to the beginning of prerecorded tape segments.

SUMMARY OF THE INVENTION

In contrast to prior art schemes for estimating tape length via molded bars or the like, the present invention is directed to a time-remaining gauge in the form of printed label adapted to be affixed to a video cassette by the end user. Furthermore, the gauge is provided with precise markings enabling the user to immediately know the amount of time remaining until the end of the tape is reached, without requiring any inductive reasoning, comparisons of spool diameters or the like, which have caused such confusion in the past.

In particular, the time-remaining gauge of the present invention is adapted to be affixed to a window of a video cassette which covers a spool on which a magnetic recording tape may be wound. The gauge comprises a substrate having on one side a layer of a pressure sensitive adhesive for securing the gauge to the window, and having on the other side printed indicia including a plurality of marks positioned to correspond to different radii on the spool. The gauge also includes legends associated with the marks which identify different predetermined tape speeds and the time remaining at each of those speeds at the different radii. An end user may thus adhere the gauge to the cassette window and in use, visually align the outer radius of the tape on the spool below the window with one or more marks to accurately determine the amount of running time remaining until the end of the tape is reached.

BRIEF DESCRIPTION OF THE DRAWINGS

FIGS. 6 and 7 are broken away views of VHS type video cassettes having time-remaining gauges pursuant to the present invention affixed thereto; and FIG. 8 is a broken away view of a Beta format video cassette having a time-remaining gauge pursuant to the present invention affixed thereto.

DETAILED DESCRIPTION OF THE INVENTION

Figure 1:
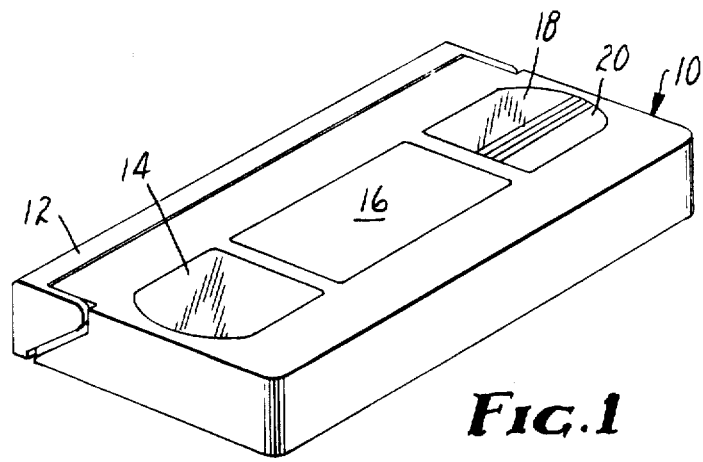
FIG. 1 is a perspective view of a video cassette including a time-remaining gauge pursuant to the present invention.

FIG. 1 shows a perspective view of a VHS type video cassette 10, such a cassette having a pivotal door 12 which when opened allows access to the video tape contained therein, a window 14 covering a supply reel on which the tape is provided, a center region 16 upon which appropriate labels identifying the cassette and/or recorded matter therein may be placed, and a window 18 over the take-up reel and which allows one to generally inspect the reel and determine the amount of tape thereon. Particular to the present invention, also shown in FIG. 1 as affixed to the window 18 over the take-up spool is a time-consuming gauge 20, details of which will be described hereinafter.

Figure 2:
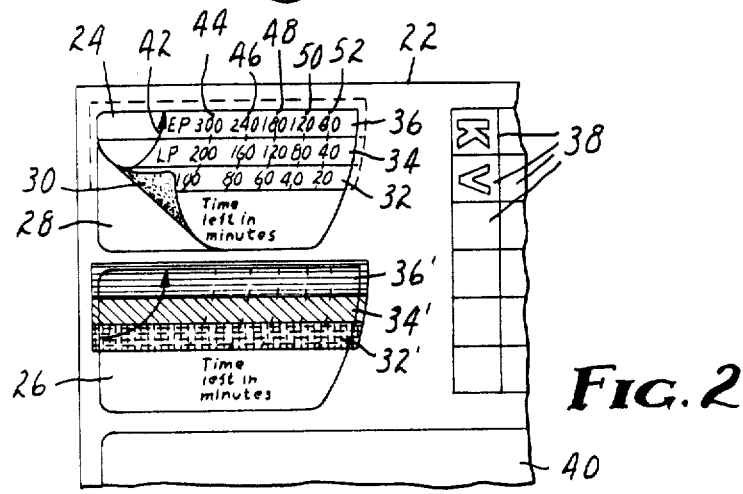
FIGS. 2 and 3 show broken away views of label sheets containing embodiments of the time-remaining gauge of the present invention for use with a VHS type video cassette.

It is generally desirable to provide together with a cassette, a set of preprinted, instructions as to use, and adhesive-backed labels, enabling the end user of the cassette to mark the cassettes with appropriate identification both as to information which may be recorded on the cassette, and combinations of numbers and letters enabling individual cassettes to be identified one from the other. Pursuant to the present invention, it is further contemplated that such a label sheet would also include a time-remaining gauge of the present invention. As shown in FIG. 2, such a label sheet 22 would include, for example, two such time-remaining gauges 24 and 26, the first of which is shown to be partially lifted up from a supporting carrier sheet or low adhesion release liner 28 thus exposing the pressure sensitive adhesive 30 on the back side of the gauge 24. As particularly shown in gauge 26 and also partially in gauge 24, each gauge provided with three sets of indicia, 32, 34 and 36 corresponding to different predetermined tape speeds. Thus, for example, as shown in gauge 24 three sets of standard operating speeds are provided for: SP or standard play, LP or long play, and EP or extended play. On a T-120 cassette, SP, LP and EP would thus correspond to nominal two, four and six hour playing times respectively. Preferably, as further shown in gauge 26, wherein the printed indicia has been omitted for clarity, to enhance the ease with which a user may identify each of the respective operating speeds, each of the portions 32', 34' and 36' are printed with a different color. Thus the SP band 32' may be colored yellow, the LP band 34' colored green and the EP band 36' colored blue. While not a specific part of the present invention, it may also be noted in FIG. 2 that the label sheet 22 also includes a series of pressure sensitive preprinted labels 38 containing letters and numbers allowing each cassette to be specifically identified, and also a removable blank label 40, allowing a user to provide additional indicia identifying prerecorded selections, etc.

It may further be noted in FIG. 2 that the gauges 24 and 26, respectively, are also provided with a series of generally concentric lines, 42, 44, 46, 48, 50, and 52 corresponding to different radii extending outward from the first radial line 42. The first radial line 42 is also desirably provided with an arrow, and is positioned on the gauge so that when the gauge is affixed to the cassette window 18 in FIG. 1, the arrow will be aligned with the edge of the hub of the take-up spool visible through the window. As shown on gauge 24 the remaining concentric lines, 44, 46, 48, 50 and 52 respectively, have associated therewith various specific numbers depending upon the respective operating speed. The specific numbers thus provide a user a direct indication of the time left in minutes when the tape on the take-up spool below the window has a radius corresponding to the particular radial mark. Thus, for example, as indicated in the row 36 corresponding to an extended play speed, when the tape radius reaches the mark 44, 300 minutes of playing time would remain before the end of the tape is reached. Similarly, when lines 46, 48, 50 or 52 respectively, were reached, 240, 180, 120 or 60 minutes, respectively, of playing time would similarly remain.

Figure 3:
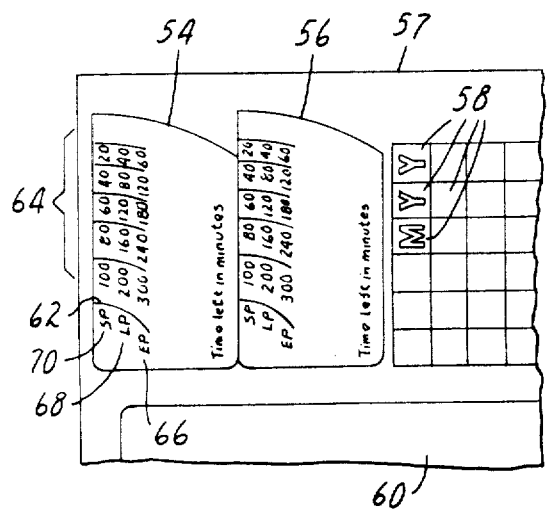

FIG. 3 sets forth a similar embodiment of a time-remaining gauge also intended for use with VHS type cassettes. As there shown, the gauges 54 and 56 are similarly a part of a larger label sheet 57 which contains preprinted alphanumeric characters 58 and at least one blank label 60 for use as set forth above. In this embodiment, while the relative dimensions of the indexing radial mark 62 and time-remaining marks identified jointly as 64 are relatively the same as that set forth in the labels of FIG. 2, the sets of indicia in rows 66, 68 and 70, respectively, indicating extended play, long play and standard play speeds are inverted in order from the embodiment shown in FIG. 1. Further, the legends are all shown in a single color format. The varying embodiments shown in FIGS. 2 and 3, are but a few of a large variety of permutations which may similarly be utilized in order that manufacturers may differentiate between various grades or configurations of cassettes.

Figure 4:
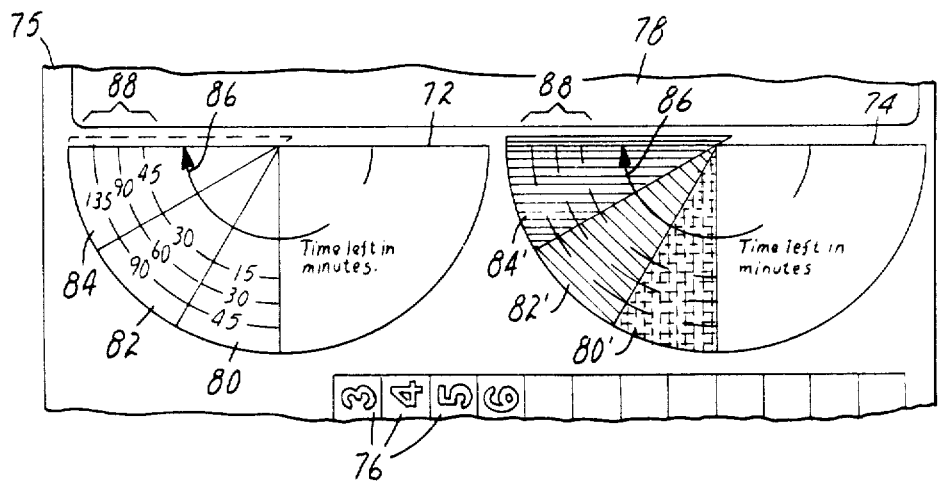
FIGS. 4 and 5 show broken away views of label sheets including time-remaining gauges according to the present invention adapted for use with Beta format video cassettes.
Figure 5:
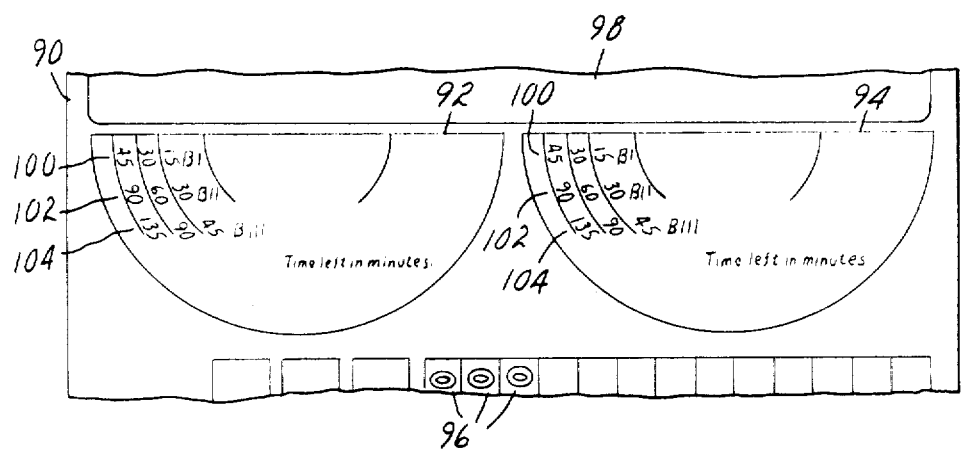

A further modification of the time-remaining gauge of the present invention adapted for use with L-500 Beta format video cassettes are set forth in FIGS. 4 and 5. As first shown in FIG. 4, two such time-remaining gauges 72 and 74 are shown as a part of a pressure sensitive adhesive label sheet 75 on which are also provided preprinted alphanumeric characters 76 together with a section of blank label 78. As Beta format cassettes are provided with a single circular window over the supply spool which allows the entire supply spool to be seen therebelow, the time-remaining gauge of the present invention adapted for use with such a cassette is desirably a semicircular configuration adapted to be affixed to half of the window. The sequence of radial concentric lines indicative of the remaining playing time is inverted relative to that provided with a VHS type gauge intended to be affixed to the window over a take-up spool. Accordingly, as shown in FIG. 4, the left hand portions of the gauges 72 and 74 are provided with angular sectors 80, 82 and 84 respectively, each of which is associated with a different operating speed, Beta$_I$, Beta$_{II}$, and Beta$_{III}$ respectively. As in gauge 74, wherein the time indicating indicia are omitted for clarity, each of the sectors 80', 82' and 84' respectively, are desirably printed in different colors, may be similarly so provided. Thus, for example, the sector 80' indicative of the Beta$_I$ speed (a one hour recording time) may be printed in yellow, sector 82', indicative of the Beta$_{II}$ (two hour recording time) printed in green, and sector 84' associated with Beta$_{III}$ (a three hour recording time) printed in blue. Similar to that shown in FIGS. 2 and 3, the gauges 72 and 74 are also provided with series of radial marks. The first mark 86 is provided with an arrow adapted to be aligned with the outer edge of the hub of the supply spool when the gauge is installed. The remaining lines, shown jointly as 88, are marked proportionately to indicate the amount of time left in minutes when the tape remaining on the supply spool has a radius as indicated by the respective marks.

As further shown in FIG. 5, a somewhat different label sheet 90, also adapted for use with L-500 Beta format cassettes, may be seen to include a pair of time-remaining gauges 92 and 94, preprinted indicia 96 and blank labels 98. In the embodiment shown in FIG. 5, the respective indicia corresponding with each of the predetermined tape speeds are shown on different parallel lines 100, 102 and 104, rather than being disposed about different angular sectors as in FIG. 4. Illustrative of possible variations the embodiment of FIG. 5 may be desirably printed in a single color rather than the multicolored format of FIG. 4 to thereby distinguish between various grades or type of cassettes provided by a given manufacturer, and has the indicia corresponding to the different time remaining marks inverted from that shown in FIG. 4.

FIG. 6 sets forth a cut-away view of a VHS cassette 10, as shown in FIG. 1, having the pivotal door 12 associated therewith. As further shown there, a window 18 over the take-up spool is similarly provided. Visible through the window 18 as shown in FIG. 6, may be seen the take-up reel comprising an inner hub 106, transparent flange 110 and loaded onto the hub and covered by the flange a pack of magnetic recording tape 112. As shown in detail in FIG. 2, the gauge is provided with a first radial mark 42, which upon installation on the cassette 10, is aligned with the outer radius of the hub 106. With the tape pack at the relative diameter shown in FIG. 6 and with an expected playing speed corresponding to the extended play tape speed 36 shown in FIG. 2, one would readily appreciate that by interpolating between the marks identified as 300 and 240 respectively, approximately 290 minutes of operating time would remain.

As further shown in FIG. 7, a similar VHS type cassette 114 having a pivotal door 116 is shown having another embodiment of a time-remaining gauge 118 affixed to the window 120 over the take-up spool. Also visible through the window 120 may be seen a take-up reel including a hub 122 and flange 124 together with a partially wound tape pack 126. The time remaining gauge 118 shown in FIG. 7, corresponds to the embodiment shown in FIG. 3 such that the indicia associated with each of the respective tape speeds are inverted over that shown in FIGS. 2 and 6 respectively. Similar to that shown in FIG. 3, all indicia are printed on gauge 118 in a single color. As shown in FIG. 7, assuming an intended operating speed corresponding to the standard play (SP) speed, it may be readily seen that the amount of tape on the tape pack 126 would correspond to a remaining playing time left in minutes of approximately 95 minutes.

In like fashion, FIG. 8 sets forth a cut-away view of a L-500 Beta format video cassette 128 having a door 130 allowing access during operation to the magnetic recording tape positioned therein. Such a cassette has a circular window 132 positioned over the supply spool. Visible through the top portion of the window 132 may be seen such a spool consisting of a hub 134 and transparent upper flange 136 through which may be seen a partially wound pack of tape 138. A time-remaining gauge 135 such as shown in FIG. 4 is shown affixed to the lower half of the window 132. The respective indicia associated with the three different tape speeds are similarly shown in three angular sectors 140, 142 and 144 respectively. Upon application of the gauge 135 to the cassette 128, the inner mark 139 is desirably aligned with the outer edge of the tape hub 134, thereby enabling a precise measurement of the outer radius of the tape pack 138 against the respective time-remaining marks 141. It may thus be readily seen that assuming a tape speed corresponding with Beta$_{III}$ (three hour maximum playing time) that approximately 60 minutes remain until the end of the tape is reached.

In constructing time-remaining gauges pursuant to the present invention, it has been found that on VHS cassettes there is a radial length of about 29.5 millimeters between the take-up spool hub and the maximum radius of the tape corresponding to a tape pack providing two, four or six hours of playing time, depending upon the preselected tape speed. Thus, for example, at the SP speed providing two hours of playing time, appropriate marks may be placed at the following radial distances to provide an indication of the time left in minutes as shown in the following Table I, assuming the cassette to be played in a standard play or two hour mode.

TABLE I

| VHS Type T-120 Cassette manufactured by 3M Company | | |
|---|---|---|
| Distance from edge of Hub (mm) | Time left (minutes) | (SP-2 hr mode) |
| 0 | 120 | |
| 7.5 | 100 | |
| 13.5 | 80 | |
| 18.5 | 60 | |
| 22.5 | 40 | |
| 26.5 | 20 | |
| 29.5 | 0 | |

Similarly, it has been found that Beta type cassettes extend radially 19 millimeters between the hub and outer periphery of a fully wound tape pack, such that marks may be placed at the following radial distances from the hub to indicate a corresponding amount of time left as shown in the following Table II, it being assumed that distances are measured from the edge of the supply spool and that the cassette is being operated in the Beta$_{II}$ mode, i.e., a three hour total playing time.

TABLE II

| Beta-Type L-750 Cassette | |
|---|---|
| Distance from edge of supply spool hub (mm) | Time left (minutes) |
| 19 | 180 |
| 17 | 150 |
| 14 | 120 |
| 12 | 90 |
| 8 | 60 |
| 5 | 30 |
| 0 | 0 |

It may thus be readily appreciated that the relative positioning of other marks may be readily varied, depending upon the type of cassette, the total amount of tape, anticipated operating time, or predetermined tape speeds provided. The gauges and appropriate indicia thereon may also be modified to be used over either a supply or take-up spool. It is similarly within the scope of the present invention that the specific configurations of the time-remaining gauge of the present invention may be altered depending upon normal typographic preferences.

We claim:

1. A time-remaining gauge adapted to be affixed to a window covering a spool within a video cassette on which a magnetic recording tape may be wound, comprising a sheet-like substrate having on one side thereof a layer of pressure sensitive adhesive for securing said gauge to said window and having indicia including a plurality of marks positioned to correspond to different radii on said spool and legends associated therewith identifying predetermined running speeds and the time remaining at a given speed at said diameters on said spool, whereby a user may affix the gauge to the cassette window and visually align the outer radius of the tape on the spool with said marks to accurately determine the amount of running time remaining until the end of the tape is reached.

2. A gauge according to claim 1, adapted for use with a video cassette and including marks associated with at least one different recording/playback speed, said marks being further specified to indicate time remaining depending upon the total playing time of the tape within the cassette intended to be used therewith.

3. A gauge according to claim 1, further comprising a low adhesion release liner adjacent to said pressure sensitive adhesive layer.

* * * * *